US012591650B2

(12) United States Patent
Nichols et al.

(10) Patent No.: US 12,591,650 B2
(45) Date of Patent: \*Mar. 31, 2026

(54) INPUT/OUTPUT PRIVACY TOOL

(71) Applicant: Wells Fargo Bank, N.A., San Francisco, CA (US)

(72) Inventors: Tambra Nichols, Charlotte, NC (US); Teresa Lynn Rench, Mount Holly, NC (US); Jonathan Austin Hartsell, Mooresville, NC (US); John C. Brenner, Chesterfield, MO (US); Christopher James Williams, Mooresville, NC (US)

(73) Assignee: Wells Fargo Bank, N.A., San Francisco, CA (US)

( \* ) Notice: Subject to any disclaimer, the term of this patent is extended or adjusted under 35 U.S.C. 154(b) by 235 days.

This patent is subject to a terminal disclaimer.

(21) Appl. No.: 18/599,700

(22) Filed: Mar. 8, 2024

(65) Prior Publication Data

US 2024/0211572 A1 Jun. 27, 2024

Related U.S. Application Data

(63) Continuation of application No. 17/806,389, filed on Jun. 10, 2022, now Pat. No. 12,001,536, which is a
(Continued)

(51) Int. Cl.
*G06F 21/32* (2013.01)
*G10L 15/22* (2006.01)
(Continued)

(52) U.S. Cl.
CPC .............. *G06F 21/32* (2013.01); *G10L 15/22* (2013.01); *G10L 17/00* (2013.01); *G10L 17/06* (2013.01);
(Continued)

(58) Field of Classification Search
CPC ....... G06F 21/32; H04W 12/08; H04W 12/06; G10L 17/06; G10L 17/22; G10L 17/005;
(Continued)

(56) References Cited

U.S. PATENT DOCUMENTS 6,937,702 B1 8/2005 Vacek et al.
7,296,734 B2 11/2007 Pliha
(Continued)

FOREIGN PATENT DOCUMENTS

WO WO-2016176834 A1 11/2016

OTHER PUBLICATIONS

Ajili et al., Speech and speaker recognition for home automation, Dec. 3, 2015, IEEE Xplore, pp. 1-10 (Year: 2015).\*
(Continued)

*Primary Examiner* — Catherine Thiaw
*Assistant Examiner* — Nega Woldemariam
(74) *Attorney, Agent, or Firm* — SCHWEGMAN LUNDBERG & WOESSNER, P.A.

(57) ABSTRACT

Various examples described herein are directed to systems and methods for managing an interface between a user and a user computing device. The user computing device may determine that an audio sensor in communication with the user computing device indicates a first command in a user voice of the user, where the first command instructs the user computing device to perform a first task. The user computing device may determine that the audio sensor also indicates a first ambient voice different than the user voice and match the first ambient voice to a first known voice. The user computing device may determine that a second computing device associated with the first known voice is within a threshold distance of the user computing device and select a first privacy level for the first task based at least in part on the first known voice.

20 Claims, 8 Drawing Sheets

Related U.S. Application Data continuation of application No. 16/930,004, filed on Jul. 15, 2020, now Pat. No. 11,366,890, which is a continuation of application No. 15/705,593, filed on Sep. 15, 2017, now Pat. No. 10,719,592.

(51) Int. Cl.

| | |
|---|---|
| *G10L 17/00* | (2013.01) |
| *G10L 17/06* | (2013.01) |
| *G10L 17/22* | (2013.01) |
| *H04L 9/40* | (2022.01) |
| *H04W 12/06* | (2021.01) |
| *H04W 12/08* | (2021.01) |
| *H04W 12/30* | (2021.01) |
| *H04W 12/63* | (2021.01) |

(52) U.S. Cl.

CPC ........... *G10L 17/22* (2013.01); *H04L 63/083* (2013.01); *H04L 63/0861* (2013.01); *H04L 63/105* (2013.01); *H04W 12/06* (2013.01); *H04W 12/08* (2013.01); *H04W 12/30* (2021.01); *H04W 12/63* (2021.01); *G10L 2015/223* (2013.01)

(58) Field of Classification Search

CPC .............. G10L 15/22; G10L 2015/223; H04L 63/0861; H04L 63/083; H04L 63/105

See application file for complete search history.

(56) References Cited

U.S. PATENT DOCUMENTS

| | | | |
|---|---|---|---|
| 8,005,680 | B2 | 8/2011 | Kommer |
| 8,028,896 | B2 | 10/2011 | Carter |
| 8,095,112 | B2 | 1/2012 | Chow et al. |
| 8,458,090 | B1 | 6/2013 | Batra et al. |
| 8,532,987 | B2 | 9/2013 | Holzrichter |
| 8,590,018 | B2 | 11/2013 | Thavasi et al. |
| 8,666,841 | B1 | 3/2014 | Claridge et al. |
| 8,909,537 | B2 | 12/2014 | You |
| 8,955,145 | B2 | 2/2015 | Vernal et al. |
| 9,104,886 | B1 | 8/2015 | Dolbakian et al. |
| 9,189,697 | B1 | 11/2015 | Daniel |
| 9,208,753 | B2 | 12/2015 | Chan et al. |
| 9,286,453 | B2 | 3/2016 | Boss et al. |
| 9,300,676 | B2 | 3/2016 | Madhu et al. |
| 9,405,918 | B2 | 8/2016 | Freed et al. |
| 9,424,836 | B2 | 8/2016 | Lee et al. |
| 9,461,970 | B2 | 10/2016 | Biswas et al. |
| 9,479,512 | B2 | 10/2016 | Castro et al. |
| 9,513,615 | B2 | 12/2016 | Madonna et al. |
| 9,578,173 | B2 | 2/2017 | Sanghavi et al. |
| 9,607,620 | B2 | 3/2017 | Jones |
| 9,647,999 | B2 | 5/2017 | Grigg et al. |
| 9,680,983 | B1 | 6/2017 | Schuster et al. |
| 9,898,610 | B1 | 2/2018 | Hadsall |
| 10,043,069 | B1 | 8/2018 | Liu et al. |
| 10,248,804 | B2 | 4/2019 | Valacich et al. |
| 10,664,845 | B1 | 5/2020 | Lambert et al. |
| 10,719,592 | B1 | 7/2020 | Nichols et al. |
| 10,719,832 | B1 | 7/2020 | Leavitt et al. |
| 11,017,115 | B1 | 5/2021 | Young et al. |
| 11,366,890 | B1 | 6/2022 | Nichols et al. |
| 11,531,988 | B1 | 12/2022 | Leavitt et al. |
| 11,847,656 | B1 | 12/2023 | Leavitt et al. |
| 2002/0078204 | A1 | 6/2002 | Newell et al. |
| 2003/0195859 | A1 | 10/2003 | Lawrence |
| 2004/0162987 | A1 | 8/2004 | Doyle et al. |
| 2006/0228003 | A1 | 10/2006 | Silverstein |
| 2006/0247919 | A1 | 11/2006 | Specht et al. |
| 2007/0071206 | A1 | 3/2007 | Gainsboro et al. |
| 2007/0192910 | A1* | 8/2007 | Vu ......................... H04N 7/142 |
| | | | 901/1 |
| 2008/0082377 | A1 | 4/2008 | Kennis et al. |
| 2009/0307028 | A1 | 12/2009 | Eldon et al. |
| 2010/0053359 | A1 | 3/2010 | Mooradian et al. |
| 2010/0205667 | A1 | 8/2010 | Anderson et al. |
| 2010/0303211 | A1 | 12/2010 | Hartig et al. |
| 2011/0099602 | A1 | 4/2011 | Apparao et al. |
| 2013/0103943 | A1 | 4/2013 | Hirsch et al. |
| 2013/0159194 | A1 | 6/2013 | Habib |
| 2013/0196642 | A1 | 8/2013 | Endo et al. |
| 2013/0316735 | A1 | 11/2013 | Li et al. |
| 2014/0058910 | A1 | 2/2014 | Abeles |
| 2014/0074977 | A1* | 3/2014 | Niida ..................... H04N 23/66 |
| | | | 709/217 |
| 2014/0157401 | A1 | 6/2014 | Alameh et al. |
| 2014/0164476 | A1 | 6/2014 | Thomson |
| 2014/0181715 | A1 | 6/2014 | Axelrod et al. |
| 2014/0214568 | A1 | 7/2014 | Argue et al. |
| 2014/0309999 | A1 | 10/2014 | Basson et al. |
| 2014/0344918 | A1 | 11/2014 | Choi et al. |
| 2015/0046161 | A1 | 2/2015 | Locker et al. |
| 2015/0046332 | A1 | 2/2015 | Adjaoute |
| 2015/0156171 | A1 | 6/2015 | Biswas et al. |
| 2015/0178501 | A1* | 6/2015 | Robison .................. G06F 21/32 |
| | | | 726/26 |
| 2015/0199523 | A1 | 7/2015 | Hamilton et al. |
| 2015/0269946 | A1 | 9/2015 | Jones |
| 2015/0302301 | A1* | 10/2015 | Petersen .............. G06Q 10/107 |
| | | | 706/11 |
| 2015/0340040 | A1* | 11/2015 | Mun ........................ G10L 17/22 |
| | | | 704/246 |
| 2016/0098992 | A1 | 4/2016 | Renard et al. |
| 2016/0118036 | A1 | 4/2016 | Cheatham, III et al. |
| 2016/0143570 | A1 | 5/2016 | Valacich et al. |
| 2016/0232353 | A1* | 8/2016 | Gupta ................... G06F 21/564 |
| 2016/0253998 | A1 | 9/2016 | Iyer et al. |
| 2016/0261532 | A1 | 9/2016 | Garbin et al. |
| 2016/0337863 | A1* | 11/2016 | Robinson .............. H04W 4/021 |
| 2016/0350553 | A1 | 12/2016 | Alameh et al. |
| 2016/0364895 | A1 | 12/2016 | Santossio et al. |
| 2017/0068550 | A1 | 3/2017 | Zeitlin |
| 2017/0092229 | A1 | 3/2017 | Greenebaum et al. |
| 2017/0180984 | A1* | 6/2017 | Thomas ................ H04M 1/667 |
| 2018/0032798 | A1 | 2/2018 | Setchell |
| 2018/0247646 | A1* | 8/2018 | Meacham ............... G10L 25/30 |
| 2018/0253757 | A1* | 9/2018 | Foladare .............. G06Q 50/188 |
| 2018/0285592 | A1* | 10/2018 | Sharifi ................... G06F 21/84 |
| 2019/0013025 | A1* | 1/2019 | Alcorn ................... G10L 15/22 |
| 2019/0014404 | A1 | 1/2019 | Olsson |
| 2019/0057687 | A1* | 2/2019 | Yang ........................ G10L 15/22 |
| 2019/0130490 | A1 | 5/2019 | Durkee et al. |
| 2019/0149955 | A1 | 5/2019 | Rusu et al. |

OTHER PUBLICATIONS

"U.S. Appl. No. 15/705,593, Final Office Action mailed Dec. 26, 2019", 11 pgs.

"U.S. Appl. No. 15/705,593, Non Final Office Action mailed Jul. 25, 2019", 11 pgs.

"U.S. Appl. No. 15/705,593, Notice of Allowance mailed Mar. 17, 2020", 5 pgs.

"U.S. Appl. No. 15/705,593, Response filed Feb. 26, 2020 to Final Office Action mailed Dec. 26, 2019", 13 pgs.

"U.S. Appl. No. 15/705,593, Response filed Oct. 25, 2019 to Non-Final Office Action mailed Jul. 25, 2019", 12 pgs.

"U.S. Appl. No. 15/797,840, Advisory Action mailed Oct. 24, 2019", 3 pgs.

"U.S. Appl. No. 15/797,840, Final Office Action mailed May 21, 2020", 17 pgs.

"U.S. Appl. No. 15/797,840, Final Office Action mailed Aug. 1, 2019", 15 pgs.

"U.S. Appl. No. 15/797,840, Non Final Office Action mailed Jan. 30, 2020", 16 pgs.

"U.S. Appl. No. 15/797,840, Non Final Office Action mailed Feb. 20, 2019", 16 pgs.

"U.S. Appl. No. 15/797,840, Non Final Office Action mailed Aug. 27, 2020", 19 pgs.

(56)          References Cited

OTHER PUBLICATIONS

"U.S. Appl. No. 15/797,840, Notice of Allowance mailed Jan. 25, 2021", 10 pgs.
"U.S. Appl. No. 15/797,840, Response filed Apr. 30, 2020 to Non Final Office Action mailed Jan. 30, 2020", 9 pgs.
"U.S. Appl. No. 15/797,840, Response filed Jul. 15, 2020 to Final Office Action mailed May 21, 2020", 9 pgs.
"U.S. Appl. No. 15/797,840, Response filed Jul. 18, 2019 to Non-Final Office Action mailed Feb. 20, 2019", 16 pgs.
"U.S. Appl. No. 15/797,840, Response filed Oct. 1, 2019 to Final Office Action mailed Aug. 1, 2019", 10 pgs.
"U.S. Appl. No. 15/797,840, Response filed Nov. 25, 2020 to Non Final Office Action mailed Aug. 27, 2020", 9 pgs.
"U.S. Appl. No. 15/869,230, Notice of Allowance mailed Mar. 13, 2020", 8 pgs.
"U.S. Appl. No. 15/869,230, Response filed Feb. 19, 2020 to Restriction Requirement mailed Dec. 19, 2019", 6 pgs.
"U.S. Appl. No. 15/869,230, Restriction Requirement mailed Dec. 19, 2019", 7 pgs.
"U.S. Appl. No. 16/929,754, Examiner Interview Summary mailed Dec. 29, 2021", 2 pgs.
"U.S. Appl. No. 16/929,754, Non Final Office Action mailed Jan. 25, 2022", 9 pgs.
"U.S. Appl. No. 16/929,754, Non Final Office Action mailed Oct. 4, 2021", 7 pgs.
"U.S. Appl. No. 16/929,754, Notice of Allowance mailed May 17, 2022", 11 pgs.
"U.S. Appl. No. 16/929,754, Notice of Allowance mailed Aug. 3, 2022", 10 pgs.
"U.S. Appl. No. 16/929,754, Response filed Apr. 25, 2022 to Non Final Office Action mailed Jan. 25, 2022", 10 pgs.
"U.S. Appl. No. 16/929,754, Response filed Dec. 8, 2021 to Non Final Office Action mailed Oct. 4, 2021", 10 pgs.
"U.S. Appl. No. 16/929,754, Supplemental Amendment filed Jun. 29, 2022", 8 pgs.
"U.S. Appl. No. 16/930,004, Non Final Office Action mailed Oct. 28, 2021", 12 pgs.
"U.S. Appl. No. 16/930,004, Notice of Allowance mailed Feb. 23, 2022", 14 pgs.
"U.S. Appl. No. 16/930,004, Response filed Dec. 23, 2021 to Non Final Office Action mailed Oct. 28, 2021", 10 pgs.
"U.S. Appl. No. 17/806,389, Corrected Notice of Allowability mailed Feb. 8, 2024", 2 pgs.
"U.S. Appl. No. 17/806,389, Final Office Action mailed Sep. 22, 2023", 13 pgs.
"U.S. Appl. No. 17/806,389, Non Final Office Action mailed Apr. 27, 2023", 12 pgs.
"U.S. Appl. No. 17/806,389, Notice of Allowance mailed Jan. 31, 2024", 15 pgs.
"U.S. Appl. No. 17/806,389, Response filed Jul. 25, 2023 to Non Final Office Action mailed Apr. 27, 2023", 11 pgs.
"U.S. Appl. No. 17/806,389, Response filed Dec. 22, 2023 to Final Office Action mailed Sep. 22, 2023", 13 pgs.
"U.S. Appl. No. 18/068,119, Notice of Allowance mailed Sep. 15, 2023", 10 pgs.
Fawcett, Tom, et al., "Adaptive Fraud Detection", NYNEX Science and Technology, (Jul. 11, 1997), 291-316.
Kitten, Tracy, "Voice Biometrics as a Fraud Fighter", (May 22, 2012), 6 pgs.
Litan, Avivah, "Preventing Fraud in the Call Center with Phone Printing and Voice Biometrics", (Jun. 18, 2014), 4 pgs.
Nan-Wei, et al., "Dynamic Privacy Management in Pervasive Sensor Networks", Ambient Intelligence. Proceedings First International Joint Conference, Aml, (2010), 96-106.
Ruiz-Agundez, Igor, et al., "Fraud Detection for Voice over IP Services on Next-Generation Networks", https://www.deusto.es, (2010), 14 pgs.
Schaub, et al., "Towards context adaptive privacy decisions in ubiquitous computing", 2012 IEEE International Conference on Pervasive Computing and Communications Workshops (PerCom Workshops), (2012), 407-410.
Shahani, Aarti, "Why Phone Fraud Starts with a Silent Call", (Aug. 24, 2015), 6 pgs.

* cited by examiner

300

INPUT/OUTPUT PRIVACY TOOL

CLAIM OF PRIORITY

This application is a continuation of U.S. patent application Ser. No. 17/806,389, filed Jun. 10, 2022, which is a continuation of U.S. patent application Ser. No. 16/930,004, filed Jul. 15, 2020, now issued as U.S. Pat. No. 11,366,890, which is a continuation of U.S. patent application Ser. No. 15/705,593, filed Sep. 15, 2017, now issued as U.S. Pat. No. 10,719,582, each of which claims the benefit of priority and are incorporated by reference herein in their entirety.

TECHNICAL FIELD

Embodiments described herein generally relate to systems and methods for improved interfacing between a human user and a computing device.

BACKGROUND

Voice interfaces for computing devices allow users to provide commands to computing devices with their voices and receive outputs from a computing device speaker. In this way, user's may "converse" with the computing device.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
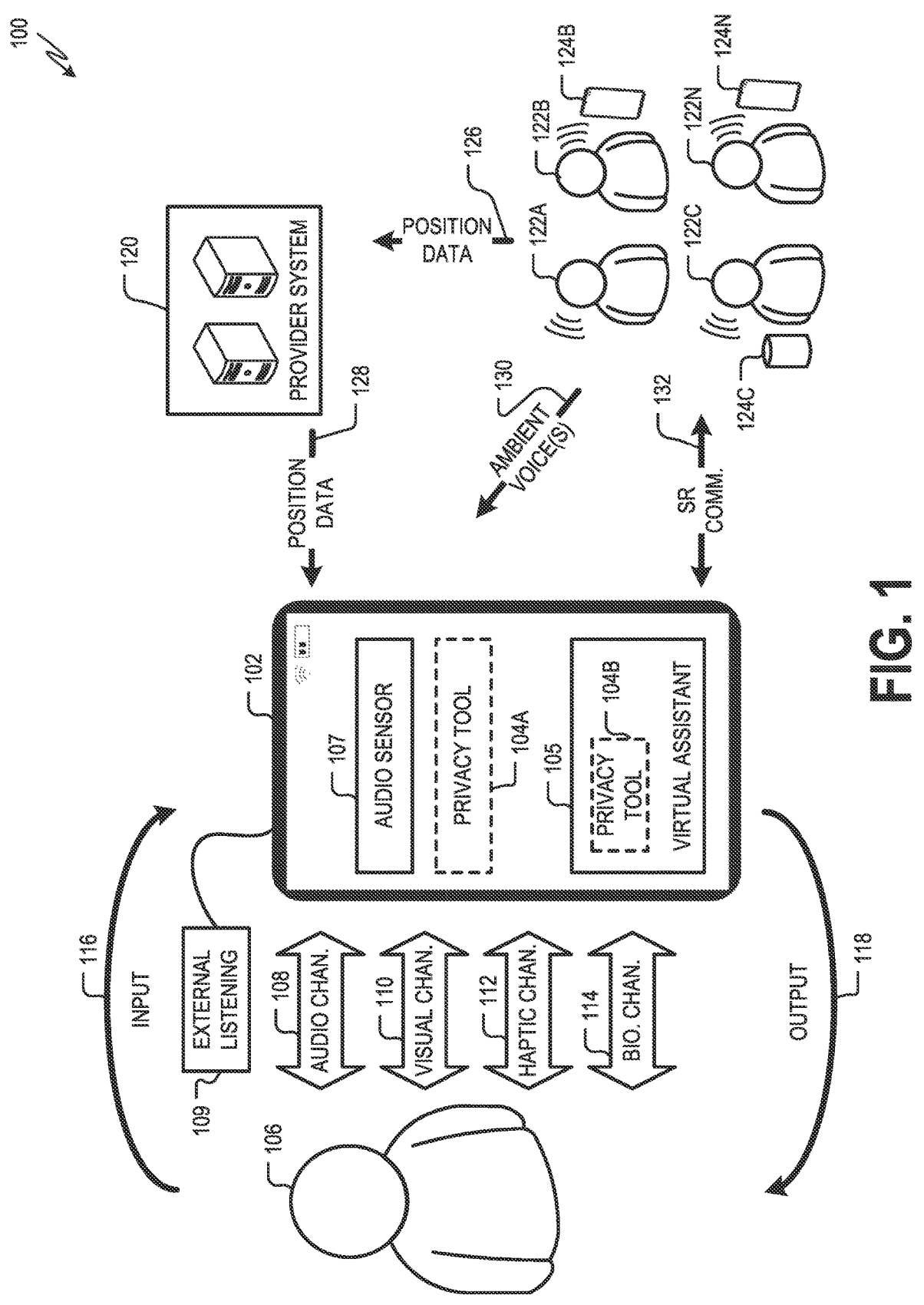
FIG. 1 is a diagram showing one example of an environment for utilizing a user computing device with a privacy tool.

Various examples described herein are directed to voice interface privacy tools and methods related thereto. When using a voice interface to a user computing device, a user speaks commands to the user computing device and receives audible output. Although this may be a convenient way to interact with a computer, it also presents privacy concerns.

Some user interactions may be of a private nature. For example, a user may request information or advice of a financial or personal nature. If the user is among strangers, or even acquaintances, the user may not want to receive audible output that may be overheard by the people around. Also, in some examples, the user computing device may request private input from the user. For example, the user computing device may prompt the user to provide a Social Security number, credit card number, or other sensitive data that could potentially be overhead by other people around the user.

In various examples, the user computing device includes a microphone or other suitable audio sensor for receiving audible input. The audio sensor may generate signals that indicate the voice of the user (e.g., the user voice) and may also indicate other ambient voices of a person or people around the user computing device. In some examples, the audio sensor may also capture other ambient sounds, such as traffic, noise from cars, trains or other vehicles, etc. A privacy tool may detect ambient sounds and modify a privacy level for tasks executed at the user computing device. The privacy tool may determine if a detected ambient voices match any known voices. If an ambient voice matches a known voice corresponding to a person who is trusted by the user (e.g., a family member, etc.), then the privacy tool may select a low privacy level, for example, using an audible channel for communication between the user computing device and the user. If an ambient voice does not match a known voice, or if it matches a known voice that is untrusted, the privacy tool may select a higher privacy level. At the higher privacy level, for example, the user computing device and/or virtual assistant application may receive fewer inputs and provide fewer outputs via an audio channel, instead utilizing a visual, haptic, or biometric channel for communication between the user and the user computing device.

The privacy tool may determine if an ambient voice matches a known voice in any suitable manner. For example, the privacy tool may compare a detected ambient voice to a set of known voices. The comparison may be performed, for example, by comparing properties of the ambient voice to properties of the known voice. For example, the privacy tool may compare the frequency content of an ambient voice to the frequency content of known voices in the set of known voices. In some examples, if a match is found between the ambient voice and a known voice, the privacy tool may verify the match by determining whether a mobile computing device associated with the known voice is within a threshold distance of the user computing device. The threshold distance may be about the range of a human voice. For example, if the mobile computing device associated with the known voice is within the threshold distance, it may indicate that the person owning the known voice is close enough to the user computing device that the detected ambient voice is likely to, in fact, be the known voice. For example, the threshold distance may be on the order of a few tens of feet such as, for example, 10 feet, 20, feet, 50 feet, etc. In some examples, the threshold distance may be the communication range of a short range communication medium, as described herein.

FIG. 1 is a diagram showing one example of an environment 100 for utilizing a user computing device 102 with a privacy tool 104. The environment 100 includes a user computing device 102 executing a privacy tool 104A, 104B. The user computing device 102 may be in communication with a privacy provider system 120 that may provide various services, for example, as described herein. The privacy provider system 120 may include one or more computing devices, such as one or more servers, located at a single geographic location and/or distributed across multiple geographic locations.

Individuals 122A, 122B, 122C, 122N may be in proximity to the user computing device 102 and may generate one or more ambient voices 130 that may be captured by an audio sensor 107 of the user computing device 102. One or more of the individuals 122A, 122B, 122C, 122N may be associated with respective mobile computing devices 124B, 124C, 124N. Mobile computing devices 124B, 124C, 124N may include any suitable computing device or devices including, for example, laptop computers, tablet computers, mobile phones, smart speakers, etc.

The user computing device 102 may be any suitable computing device, for example, as described herein. For example, the user computing device 102 may be or include a laptop computer, a tablet computer, a mobile phone, etc. In some examples, the user computing device 102 includes a smart speaker device, such as, for example, an Echo® device available from Amazon.com, Inc., a Google Home® device available from Google, Inc., a HomePod® device available from Apple Inc., etc. The user computing device 102 may comprise an audio sensor 107 and a processor unit (FIGS. 6-8) for executing various applications such as, for example, a virtual assistant application 105 and a privacy tool 104A, 104B. The hardware and software of the user computing device 102 may be arranged in any suitable manner, for example, as described herein with respect to FIGS. 6-8. The user computing device 102 may also be in communication with an external listening device 109 such as, for example, a set of headphones, a set of earbuds, etc. The user computing device 102 may be in communication with the external listening device 109 via a wired or wireless connection.

The user computing device 102 may interact with a user 106. For example, the user 106 may provide input 116 to the user computing device 102 and receive output 118 from the user computing device 102 via one or more input/output (I/O) channels 108, 110, 112, 114. I/O channels 108, 110, 112, 114 describe ways that the user 106 may provide input 116 to and/or receive output 118 from the user computing device 102. For example, I/O channels may utilize input devices (e.g., audio sensor 107, keyboards, touchscreens, cameras, other sensors, etc.) and output devices (e.g., speakers, external listening devices 109, displays, etc.) to receive input 116 from the user and/or provide output 118 to the user.

An audio channel 108 may permit the user 106 to provide audio input to the user computing device 102 and/or to receive audio output from the user computing device 102. For example, the audio channel 108 may utilize the audio sensor 107 to receive audio input from the user 106. The audio channel 108 may also utilize a speaker of the user computing device 102 and/or the external listening device 109 to provide audio output to the user 106.

A visual channel 110 may receive visual input from the user 106 and/or provide visual output to the user 106. Visual input may be provided, for example, when the user computing device 102 captures an image, video, etc. Visual output may be provided, for example, at a display, projector, lights, or in any other suitable manner. A haptic channel 112 may receive haptic or touch input from the user 106 and/or provide haptic or touch output to the user 106. Haptic input may be received, for example, via a touch screen, via buttons on the user computing device, etc. Haptic output may be provided, for example, by a vibrator on the user computing device 102. A biometric channel 114 may receive biometric input from the user 106 and/or provide biometric output to the user 106. For example, a camera may be used to capture an image of the user's eye or other body part. A finger print scanner may be used to sense the user's fingerprint or fingerprints, etc. Biometric output may be provided, for example, by displaying a fingerprint, eye image, or other biometric data on the display or other screen.

It will be appreciated that not all examples of the user computing device 102 will include hardware and/or software for using all of the channels 108, 110, 112, 114 for both input and output. Some examples of the user computing device 102 may not include hardware and/or software for implementing the biometric channel 114. Also, in some examples, the user computing device 102 may utilize only one side of a channel (e.g., an input side or an output side). For example, a user computing device 102 may receive haptic input from the user 106 in the form of touchpad input, keyboard input, button input, etc., but may lack hardware and/or software to provide haptic output. Also, in some examples, a user computing device 102 may receive biometric input via a biometric channel 114, but may lack hardware and/or software to provide biometric output.

The environment 100, as shown in FIG. 1, illustrates two example configurations of the privacy tool 104A, 104B. In one example configuration, the privacy tool 104A is executed by a processor unit of the user computing device 102, for example, independent of other applications executing at the user computing device 102. For example, the privacy tool 104A may be a component of an OS of the user computing device 102. The privacy tool 104A, for example, may set privacy levels as described herein for input 116 and output 118 associated with multiple applications executing at the user computing device 102.

In the example configuration of privacy tool 104B, the privacy tool 104B is associated with another application, which in this example is a virtual assistant application 105. In some examples, the privacy tool 104B sets privacy levels as described herein for inputs 116 and outputs 118 directed to or from the application (e.g., in the example of FIG. 1, a virtual assistant application 105). The privacy tool 104B may be incorporated into code for implementing the virtual assistant application 105. Although the privacy tool 104B is shown associated with the virtual assistant application 105, the privacy tool 104B may be associated with any suitable application.

The virtual assistant application 105 may be programmed to receive input 116 and provide output 118. In some examples, the virtual assistant application 105 may utilize the audio channel 108 to interact with the user 106. The virtual assistant application 105 may execute various commands from the user 106 such as, for example, commands to play music, commands to control household devices (e.g., lights, thermostats, appliances). In some examples, the virtual assistant application 105 may provide financial functionality to the user 106. For example, the virtual assistant application 105 may include functionality for providing the user 106 with balances or transactions from one or more financial accounts as well as other financial functionality. In some examples, the virtual assistant application 105 may permit the user to apply for credit, make a payment, etc.

In some examples, the virtual assistant application 105 may receive input 116 and provide output 118 in a natural language format. For example the user 106 may provide audio input describing a command. (E.g., "VA, please find the balance of my checking account.") The virtual assistant application 105 may analyze the audio input to derive the included command. The virtual assistant application 105 may also provide a natural language output. (E.g., "The balance of your checking account is $X.").

The privacy tool 104A, 104B may select and/or implement one or more privacy levels for the user computing device 102 in general and/or the virtual assistant application 105 specifically. Different security levels may utilize different combinations of the I/O channels 108, 110, 112, 114. For example, at low security levels, interactions between the user 106 and the user computing device and/or virtual assistant application 105 may use the audio channel 108 where input 116 from the user 106 is spoken and output 118 to the user 106 is at least partially spoken (e.g., at a speaker of the user computing device 102). Low security levels may be selected, for example, when no ambient voices 130 are present and/or any ambient voices 130 that are present may be matched to known voices that are trusted (e.g., voices that the user 106 trusts to hear potentially private interactions with the user computing device 102).

At higher security levels, input 116 and/or output 118 may be shifted from the audio channel 108 to a channel that is less likely to be intercepted (e.g., overheard) by people around the user 106 and user computing device 102. In some examples, a first privacy level that is more private than a second privacy level may have at least one user input 116 or output 118 shifted from the audio channel 108 to another channel such as, for example, the visual channel 110, the haptic channel 112, and/or the biometric channel 114.

For example, at a higher privacy level, at least some output 118 that would have been provided via the audio channel 108 at a lower privacy level may be provided via the visual channel 110. For example, it may be easier for the user 106 to prevent individuals 122A, 122B, 122C, 122N from seeing a display of the user computing device 102 than to prevent the individuals 122A, 122B, 122C, 122N from overhearing the output of a speaker of the user computing device 102. In some examples, at higher security levels, user input may be prompted to be provided at channels other than the audio channel 108. For example, instead of requesting that the user 106 recite his or her Social Security number (or other sensitive information), the user computing device 102 and/or virtual assistant application 105 may prompt the user 106 to provide the Social Security number or other sensitive information via the haptic channel 112 (e.g., via a keyboard, touchscreen, or other suitable input device).

At some higher privacy levels, all input 116 and output 118 may be shifted away from the audio channel 108. In other, less private, privacy levels, less than all inputs 116 and outputs 118 are shifted away from the audio channel 108. For example, more sensitive input 116 and output 118 may be shifted to another I/O channel 110, 112, 114 while less sensitive input 116 and output 118 may remain on the audio channel 108. For example, the user 106 may be audibly prompted to provide sensitive information, such as a credit card or Social Security number, but may provide that information via a haptic channel 112 (e.g., via a keyboard or touchscreen). Also, some types of tasks involving sensitive information may be shifted from the audio channel 108 while other less sensitive tasks may be conducted on the audio channel 108. For example, at some privacy levels, a task that returns a weather forecast may be performed over the audio channel 108, while a task that returns a balance from the user's investment account may be shifted to another I/O channel.

In some examples, the form or format of input 116 and/or output 118 may be modified at some higher privacy levels. For example, outputs 118 that include sensitive information, such as the user's Social Security number, credit card numbers, may be obscured even if shown on the visual channel 110. Obscuring information may include, for example, replacing some or all of a set of alphanumeric characters with "x," "*," or another suitable nonce character. Obscuring information may also include, for example, blurring images or alphanumeric characters in a manner that makes it less likely that they will be recognized at distance.

Also, in some examples, the computing device 102 and/or the privacy tool 104A, 104B may implement privacy levels differently depending on whether an external listening device 109 is connected to the user computing device 102. The privacy tool 104A, 104B may determine if the external listening device 109 is private. For example, if the external listening device 109 is a Bluetooth® speaker, it may not be any more private than an internal speaker of the user computing device 102. If the external listening device 109 is a set of headphones, earbuds, or other personal audio device, there may not be a substantial risk that output 118 provided via the external listening device 109 will be overheard. Accordingly, if the external listening device 109 is present and is a personal audio device, at least some output 118 that would have been shifted away from the audio channel 108 may be provided at the audio channel 108, via the external listening device 109.

The privacy tool 104A, 104B may detect the presence and identity of the external listening device 109 in any suitable manner. For example if the external listening device 109 is a wired device connected to the user computing device, for example, via a headphone jack, the user computing device 102 may sense that an impedance connected to the headphone jack is consistent with the impedance of a set of headphones or earbuds. In some examples, the external listening device 109 may be a wireless device and may connect to the user computing device 102 via a Bluetooth® or other suitable wireless connection. In these examples, the external listening device 109 may identify itself to the user computing device 102 upon making the wireless connection.

The privacy tool 104A, 104B may be in communication with the audio sensor 107 to determine when the audio sensor 107 indicates one or more ambient voices 130. When the privacy tool 104A, 104B determines that the audio sensor 107 indicates a voice, the privacy tool 104A, 104B may determine whether the indicated voice is the voice of the user 106 (e.g., providing input 116 such as a command to execute a task) or an ambient voice 130. For example, the privacy tool 104A, 104B may compare the indicated voice to one or more known properties of the voice of the user 106 (the user voice). The privacy tool 104A, 104B may compare the indicated voice to the user voice at the user computing device 102. For example, properties of the user voice may be stored at a data storage device of the user computing device 102 and compared to properties of the indicated voice by the privacy tool 104A, 104B. In other examples, the privacy tool 104A, 104B may send data describing the indicated voice to the provider system 120, which may make the comparison.

If the voice is not that of the user 106 (e.g., it is an ambient voice 130), then the privacy tool may compare the ambient voice 130 to a set of known voices corresponding to known individuals. The privacy tool 104A, 104B may complete the comparison locally at the user computing device 102. For example, known voice data describing the known voices may be stored at a data storage device of the user computing device 102. The privacy tool 104A, 104B may compare an indication of an ambient voice 130 received from the audio sensor 107 to the known voice data to determine if the ambient voice 130 matches a known voice. In other examples, the privacy tool 104A, 104B may send the indication of an ambient voice 130 captured by the audio sensor 107 to the provider system 120, which may perform a comparison between the ambient voice 130 and a set of known voices and return a match, if any.

If the ambient voice 130 is not matched to a known voice, it may mean that the user 106 and the computing device 102 are positioned near an unknown individual who may overhear audible interactions between them. Accordingly, the privacy tool 104A, 104B may select a high level of privacy, for example, that minimizes input 116 and/or output 118 utilizing the audio channel 108.

If the ambient voice 130 is matched to a known voice, then, in some examples, the privacy tool 104A, 104B may identify a mobile computing device 124B, 124C, 124N associated with the known voice. For example, the mobile computing device 124B, 124C, 124N associated with the known voice may be a computing device of the known person having the known voice. The privacy tool 104A, 104B may check to determine whether the mobile computing device 124B, 124C, 124N is within a threshold distance of the user computing device 102. For example, if the mobile computing device 124B, 124C, 124N is within the threshold distance of the user computing device 102, it may verify that the known person is near the user computing device 102, making it more likely that the ambient voice 130 is indeed the known voice of the known person.

The privacy tool 104A, 104B may verify that mobile computing device 124B, 124C, 124N is within the threshold distance of the user computing device 102 in any suitable manner. In some examples, the mobile computing devices 124B, 124C, 124N may execute an application that provides position data 126 indicating the location of the mobile computing devices 124B, 124C, 124N to the provider system 120. The privacy tool 104A, 104B may query the provider system 120 and receive location data 128 describing the location of the relevant mobile computing device 124B, 124C, 124N. The privacy tool 104A, 104B may compare the received location to the location of the user computing device 102. The user computing device 102 and/or mobile computing devices 124B, 124C, 124N may determine their respective locations utilizing a Global Positioning System (GPS) or other suitable location device.

In some examples, the privacy tool 104A, 104B may determine whether the mobile computing device 124B, 124C, 124N is within the threshold distance of the user computing device 102 by attempting a connection to the mobile computing device 124B, 124C, 124N via a short range communication medium 132. A short range communication medium may be a wireless medium, for example, that permits a direct device-to-device connection between the user computing device 102 and the relevant mobile computing device 124B, 124C, 124N. The privacy tool 104A, 104B attempts to connect with the relevant mobile computing device 124B, 124C, 124N via the short range communication medium 132. If the connection is successful, it may indicate that the mobile computing device 124B, 124C, 124N is within the threshold distance of the user computing device 102. If the connection is unsuccessful, it may indicate that the mobile computing device 124B, 124C, 124N is not within the threshold distance of the user computing device 102. The short range communication medium may be any suitable optical, electromagnetic, or other wireless medium such as, for example, a Bluetooth® medium, a Near Field Communication (NFC) medium, an infrared medium, etc.

In some examples, not all individuals 122A, 122B, 122C, 122N near the user device 102 may not have an associated mobile computing device 123B, 124C, 124N with them. For example, in FIG. 1, the individual 122A does not have an associated mobile computing device. Accordingly, when an ambient voice 130 is received from the individual 122A, the privacy tool 104A, 104B may not locate a mobile computing device associated with that individual 122A and may select the privacy level accordingly.

If the mobile computing device 124B, 124C, 124N is not within the threshold distance of the user computing device 102, it may indicate that privacy tool 104A, 104B has not confirmed that the ambient voice 130 is a known voice of a known individual. Accordingly, the privacy tool 104A, 104B may select the privacy level at a high level, for example, similar to the privacy level that would have been selected if the ambient voice 130 had not been matched to a known voice.

If the associated mobile computing device 124B, 124C, 124N is within a threshold distance of the user computing device 102, it may verify that the ambient voice 130 is the known voice, allowing the privacy tool 104A, 104B to select a privacy level based on the known individual. For example, if the known individual is a trusted individual, the privacy tool 104A, 104B may select a lower level of privacy, allowing more input 116 and output 118 to utilize the audio channel 108. If the known individual is untrusted (e.g., not in a set of individuals who the user 106 trusts), then the privacy tool 104A, 104B may select a privacy level with a higher level of privacy. In some examples, different known individuals may have different levels of trust. For example, the privacy tool 104A, 104B may select a lower privacy level when the known individual is the user's spouse than when the known individual is a co-worker seated next to the user 106 at work. In some examples, the user 106 may configure the privacy tool 104A, 104B to identify known individuals and set corresponding privacy levels. Also, FIG. 1 shows multiple individuals 122A, 122B, 122C, 122N.

When more than one individual 122A, 122B, 122C, 122N is near the mobile device 102, the audio sensor 107 may indicate multiple ambient voices 130. In some examples, the privacy tool 104A, 104B may select the privacy level based on the ambient voice 130 with the lowest level of trust. For example, if one of the ambient voices 130 is not identified, then the privacy tool 104A, 104B may select the privacy level considering an unknown individual (e.g., more private privacy level). Also, if one of the ambient voices 130 corresponds to a known individual that is untrusted, the privacy tool 104A, 104B may select the privacy level based on the presence of the untrusted individual.

Figure 2:
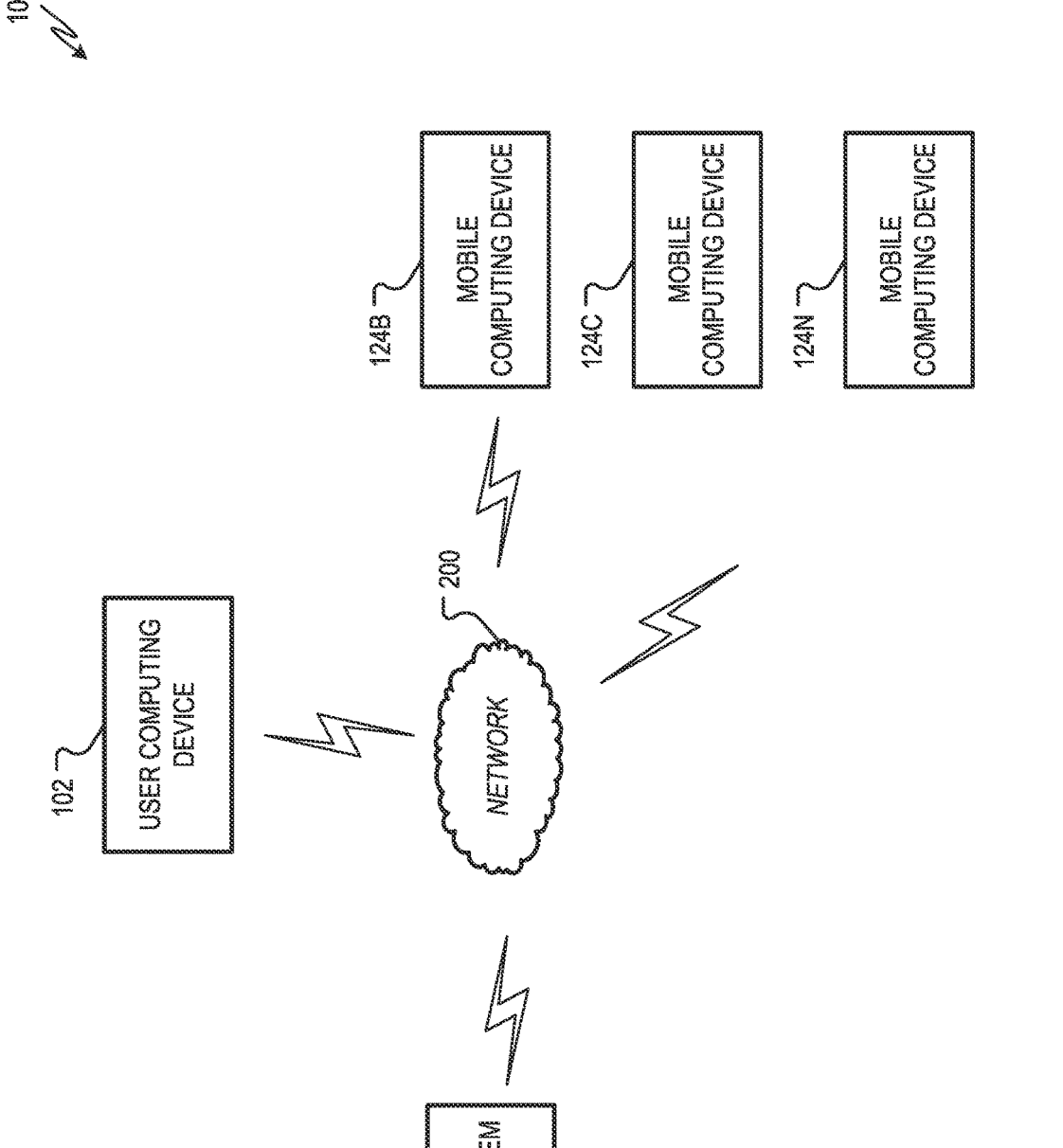
FIG. 2 is a diagram showing another example of the environment including additional details.

FIG. 2 is a diagram showing another example of the environment 100 including additional details. In the example of FIG. 2, the user computing device 102, mobile computing devices 124B, 124C, 124N, and provider system 120 are in communication with one another via a network 200. The network 200 may be or comprise any suitable network element operated according to any suitable network protocol. For example, one or more portions of network 200 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 3:
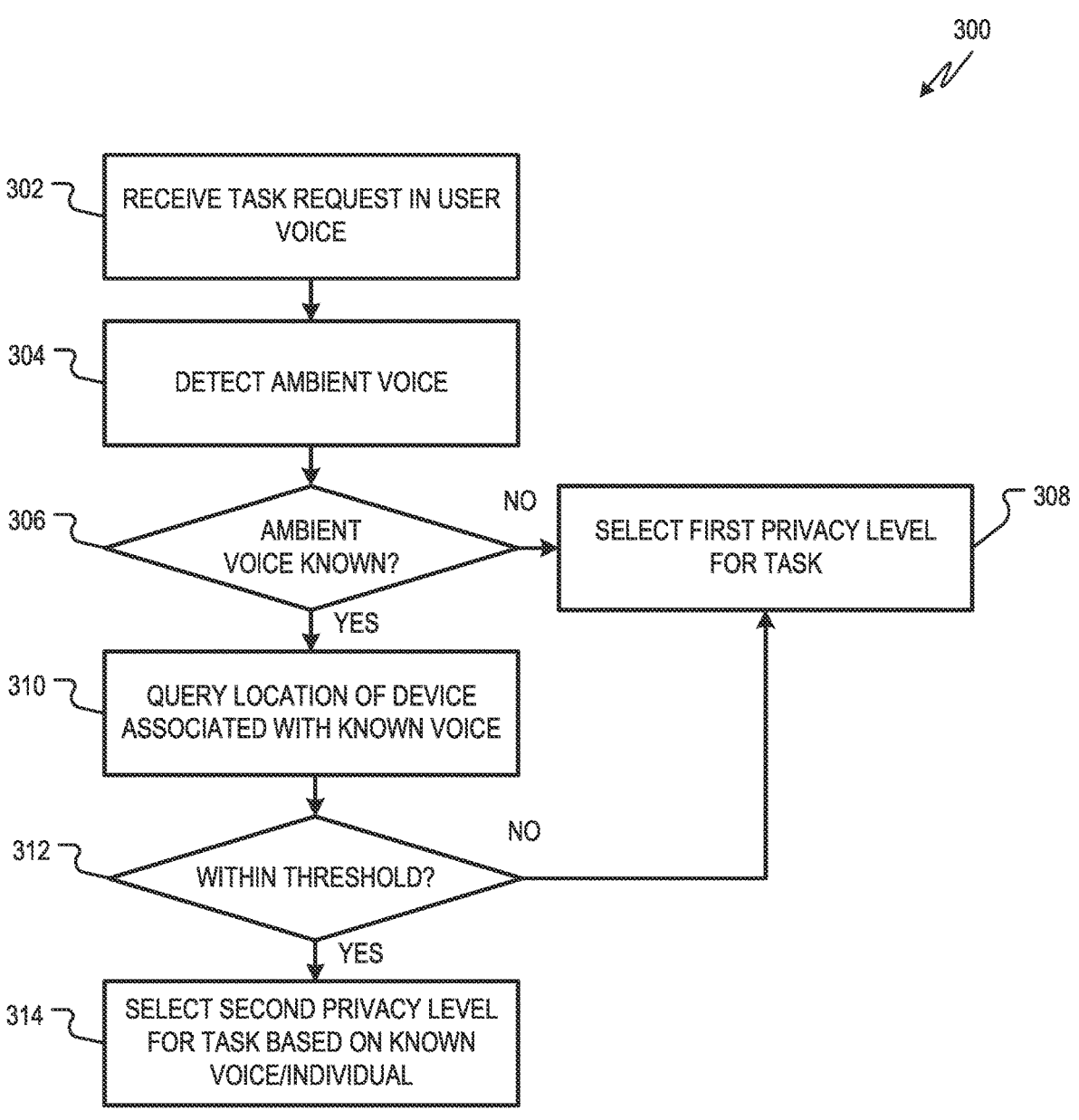
FIG. 3 is a flow chart showing one example of a process flow that may be executed by a privacy tool of the environment of FIG. 1 to select a privacy level for a task.

FIG. 3 is a flow chart showing one example of a process flow 300 that may be executed by a privacy tool, such as the privacy tool 104A, 104B of the environment 100 of FIG. 1, to select a privacy level for a task. At operation 302, the privacy tool may receive a task request from a user, such as the user 106 of the environment 100. The task request may be received via an audio I/O channel of the user computing device 102 in the user's voice. The task request may request that the user computing device 102 and/or an application, such as the virtual assistant application 105, perform a task. The task may include generating and providing any suitable output to the user. For example, the user may request particular information (e.g., when does the next showing of my favorite movie start, how much is in my checking account, etc.). The user computing device and/or virtual assistant application may execute the task by generating and providing the output. In some examples, generating the output includes prompting the user for additional input. For example, if the task includes applying for a credit card, the user computing device and/or virtual assistant application may prompt the user for additional information before generating the output, which may be a confirmation that the credit card application has been sent.

At operation 304, the privacy tool may detect an ambient voice, if any, indicated by an audio sensor of the user computing device 102. If no ambient voice is indicated at the audio sensor 107, the privacy tool may proceed to execute the task. When (at least one) ambient voice is detected at operation 304, the privacy tool may determine, at operation 306, whether the ambient voice corresponds to a known voice. As described herein, the privacy tool may compare characteristics of the ambient voice to characteristics describing a set of known voices, either locally at the user computing device or remotely at the provider system. The first privacy level may be a low privacy level that minimizes use of the audio channel 108, for example, by requesting input and providing output via a visual channel, a haptic channel, etc. In some examples, the user computing device and/or the virtual assistant application 105 may execute the task at the first privacy level.

If no match is found, then the privacy tool may, at operation 308, select a first privacy level for the selected task. In some examples, the privacy tool may also store a record of the unmatched ambient voice including, for example, characteristics of the unmatched ambient voice and an indication that the unmatched voice was indicated at the audio sensor. This data may be used, for example, to prompt the user to identify unknown ambient voices that are commonly detected, as described herein with respect to FIG. 5.

If the ambient voice matches a known voice, the privacy tool may query a location of a mobile computing device associated with the known voice at operation 310. For example, as described herein, the privacy tool may query the provider system for the location of the mobile computing device. Also, in some examples, the privacy tool may attempt to make a short range communication connection with the mobile computing device. If, at operation 312, the mobile computing device is not within the threshold distance of the user computing device, the privacy tool may select the first privacy level for the task, at operation 308. The user computing device and/or virtual assistant application 105 may execute the task at the first privacy level.

If, at operation 312, the mobile computing device is within the threshold distance of the user computing device, the privacy tool may, at operation 314, select a second privacy level for the task based on the known individual associated with the known voice. For example, a level of trust associated with the known individual may be stored at the user computing device 102 and/or at the provider system. The level of trust may have been provided, for example, by the user. If the known individual is a trusted individual to the user of the user computing device, the second privacy level may be less private than the first privacy level, (e.g., more input and/or output may be provide via the audio I/O channel). If the known individual is not a trusted individual to the user of the user computing device, the second privacy level may be equivalent to the first privacy level.

In some examples, the privacy tool may also consider other ambient noises. For example, even if the mobile computing device is within the threshold distance of the user computing device, the privacy tool may select the first privacy level (or a privacy level higher than the second privacy level) if other ambient noises indicate that the user is not in an area with privacy. For example, if ambient noises consistent with a crowd are detected, the privacy tool may select a higher privacy level. In another example, if ambient noises consistent with a train, bus, or other communal vehicle are detected, the privacy tool may select a higher privacy level. Other ambient noises may be considered before or after the privacy tool attempts to determine whether a detected ambient voice is known. For example, if other ambient noises indicating a non-private area are detected, the privacy tool may not attempt to identify the ambient voice and may, instead, select the first privacy level. In another example, the privacy tool may consider other ambient noises after the ambient voice is identified as a particular known voice. For example, if after an ambient voice is identified with a particular known voice the privacy tool also detects ambient noises consistent with a non-private area, it may select the first privacy level and/or an intermediate privacy level between the first and second levels.

In some examples, the privacy tool may select the privacy level based at least in part on a velocity of the user computing device. The velocity of the user computing device may be measured utilizing a GPS receiver or other suitable hardware. In some examples, if the user computing device is traveling at a velocity greater than a human can move, it may indicate that the user computing device and user are in a car, where inputs and outputs are more likely to be overheard. Accordingly, the privacy tool may select a higher privacy level if the user computing device is above a threshold velocity.

Also, in some examples, the privacy tool may select the privacy level based at least in part on the type of wireless network connected to the user computing device. For example, if the user computing device is connected to a cellular or mobile telephone network, it may indicate that the user and user computing device are away from home and potentially in public. The privacy tool may, accordingly, select a higher privacy level. If the user computing device is connected to a public Wi-Fi or other network, the privacy tool may similarly determine that the user and user computing device are in public and may select a higher privacy level. In another example, if the user computing device is connected to a home Wi-Fi or other network, it may indicate that the user computing device and user are at home, a potentially more private setting. Accordingly, the privacy tool may select a lower level of privacy.

In some examples, different known individuals may have different levels of trust. For example, some known individuals may be trusted to potentially overhear input and output associated with certain kinds of tasks, but not others. In some examples, the types of tasks that may be executed with the audio channel when a known individual is near may depend on the known individual. For example, some individuals may be trusted to potentially overhear tasks that include checking account balance inquiries, but not tasks that include credit card application tasks.

Figure 4:
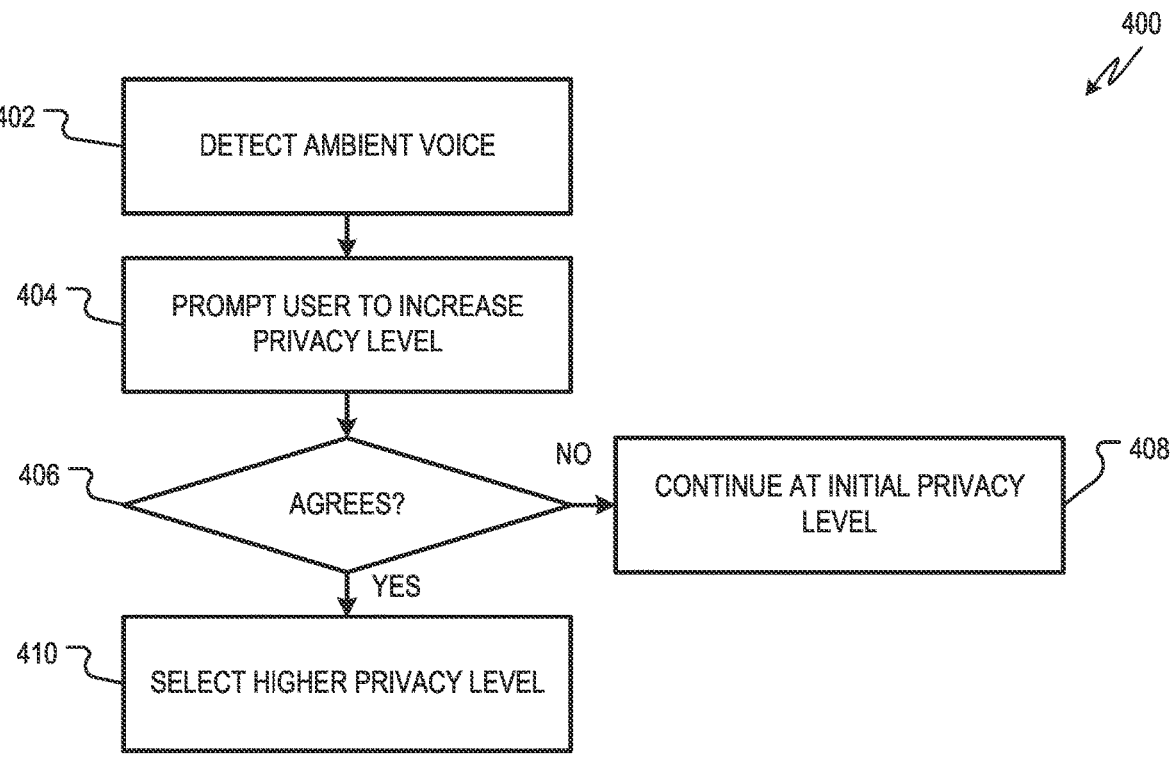
FIG. 4 is a flowchart showing one example of a process flow that may be executed by a privacy tool, such as the privacy tool of the environment, to select a privacy level (e.g., for a task).

FIG. 4 is a flowchart showing one example of a process flow 400 that may be executed by a privacy tool, such as the privacy tool 104A, 104B of the environment 100, to select a privacy level (e.g., for a task). At operation 402, the privacy tool may detect an ambient voice. For example, the audio sensor 107 may indicate an ambient voice. The privacy tool may determine that the ambient voice is not the user's voice, for example, as described herein.

At operation 404, the privacy tool may prompt the user to increase the privacy level of the user computing device and/or application (e.g., virtual assistant application). For example, the privacy tool may utilize an audio channel, a visual channel, a haptic channel, or any other suitable input/output channel to prompt the user. The user may agree to increase the privacy level, for example, if the user is in the presence of individuals who the user would not like to overhear input and/or output. The user may disagree, for example, if the user is in the company of trusted individuals.

If the user does not agree to increase the privacy level at operation 406, the privacy tool may continue at the initial level of privacy at operation 408. If the user does agree to increase the privacy level at operation 406, the privacy tool may select a higher or more private privacy level at operation 410. The higher privacy level, for example, may execute tasks with fewer inputs and/or fewer outputs that utilize an audio I/O channel. In some examples, the process flow 400 may be executed while the user computing device and/or virtual assistant application 105 is executing a task. For example, an initial privacy level for a task may be set by the process flow 300 and, if an additional ambient voice is detected during execution of the task, the process flow 400 may be executed.

Figure 5:
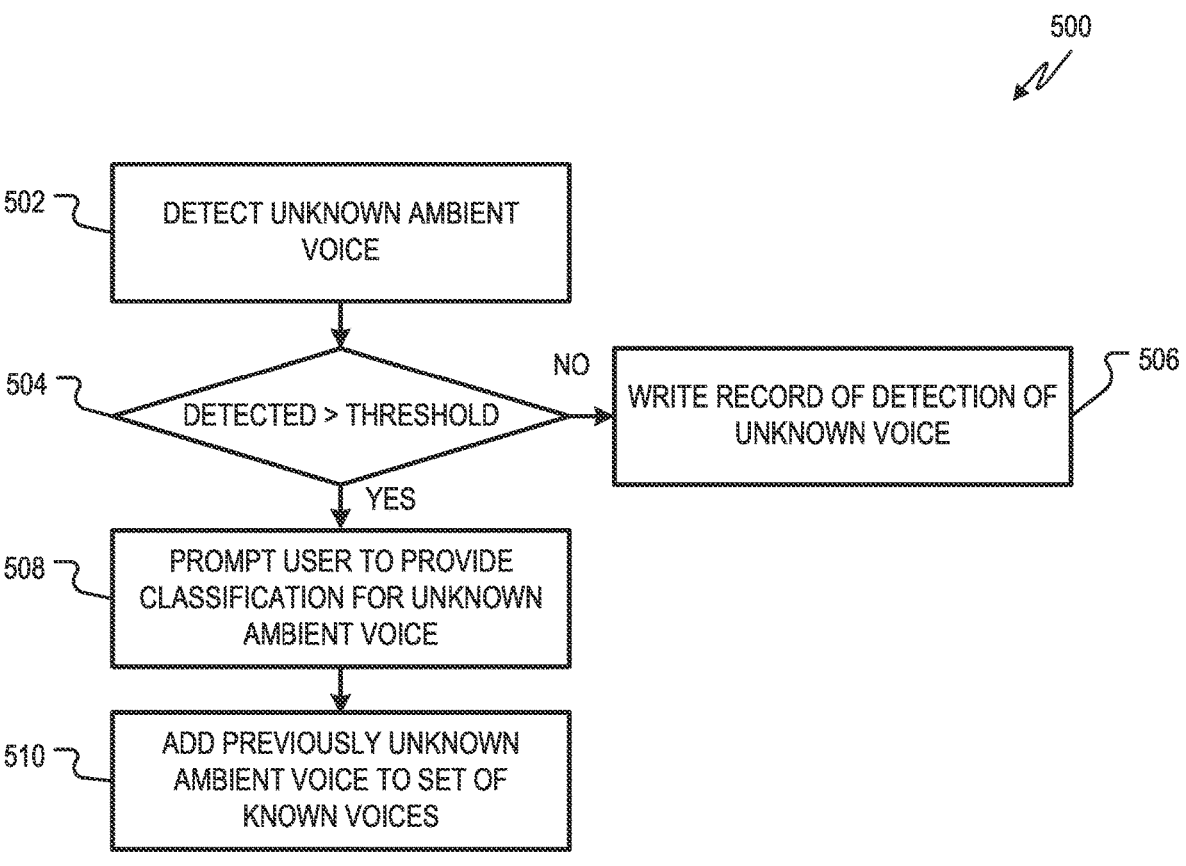
FIG. 5 is a flowchart showing one example of a process flow that may be executed by a privacy tool, such as the privacy tool of the environment, to classify known individuals.

FIG. 5 is a flowchart showing one example of a process flow 500 that may be executed by a privacy tool, such as the privacy tool 104A, 104B of the environment 100, to classify known individuals. At operation 502, the privacy tool may determine that an unknown ambient voice has been indicated by the audio sensor. For example, the privacy tool may determine that an ambient voice has been detected that does not match any of the set of known voices. (In some examples, the process flow 500 may be executed after the execution of the operation 308 of the process flow 300).

At operation 504, the privacy tool may determine if the unknown ambient voice has been previously detected more than a threshold number of times. For example, again referring to the process flow 300, in some examples, the privacy tool may determine whether an ambient voice has been detected more than a threshold number of times by referring to stored data describing ambient voices that were not matched to one of the set of known voices at operation 306. Referring back to operation 504, the threshold may be determined in any suitable manner. For example, the threshold may be an absolute number of times (e.g., the unknown ambient voice has been detected more than X times). In some examples, the threshold may be a frequency (e.g., the unknown ambient voice has been detected more than X times per week or more than X times in the past month).

If the unknown ambient voice has not been detected more than the threshold number of times, the privacy tool may, at operation 506, write a record of the detection of the unknown ambient voice. If the unknown ambient voice has not been previously detected, this may include writing a description of the unknown ambient voice, an indication that it was detected, and, in some examples, a date and them when the detection occurred.

If the unknown ambient voice has been detected more than the threshold number of times, the privacy tool may prompt the user to provide a privacy level for the unknown ambient voice at operation 508. The prompting may occur in any suitable way. In one example, the privacy tool may playback a sample of the unknown ambient voice to the user, e.g., via the audio channel, and then ask the user to provide a privacy level for the user. In another example, the privacy tool may match the unknown ambient voice to a known individual (e.g., either locally or by sending a description of the unknown ambient voice to the provider system 120, which may generate a match). After finding a match, the privacy tool may provide the user with a description of the known individual corresponding to the unknown ambient voice and prompt the user to provide a privacy level for that individual.

At operation 510, the privacy tool may expand the set of known voices to include the previously unknown ambient voice as a newly known voice. For example, the privacy tool may record parameters of the newly known voice, allowing the privacy tool to identify the newly known voice in the future. The privacy tool may also record the privacy level for the newly known voice. In some examples, when the newly known voice is detected again, it may be matched with the privacy level selected by the user, for example, as described with respect to FIG. 3.

Figure 6:
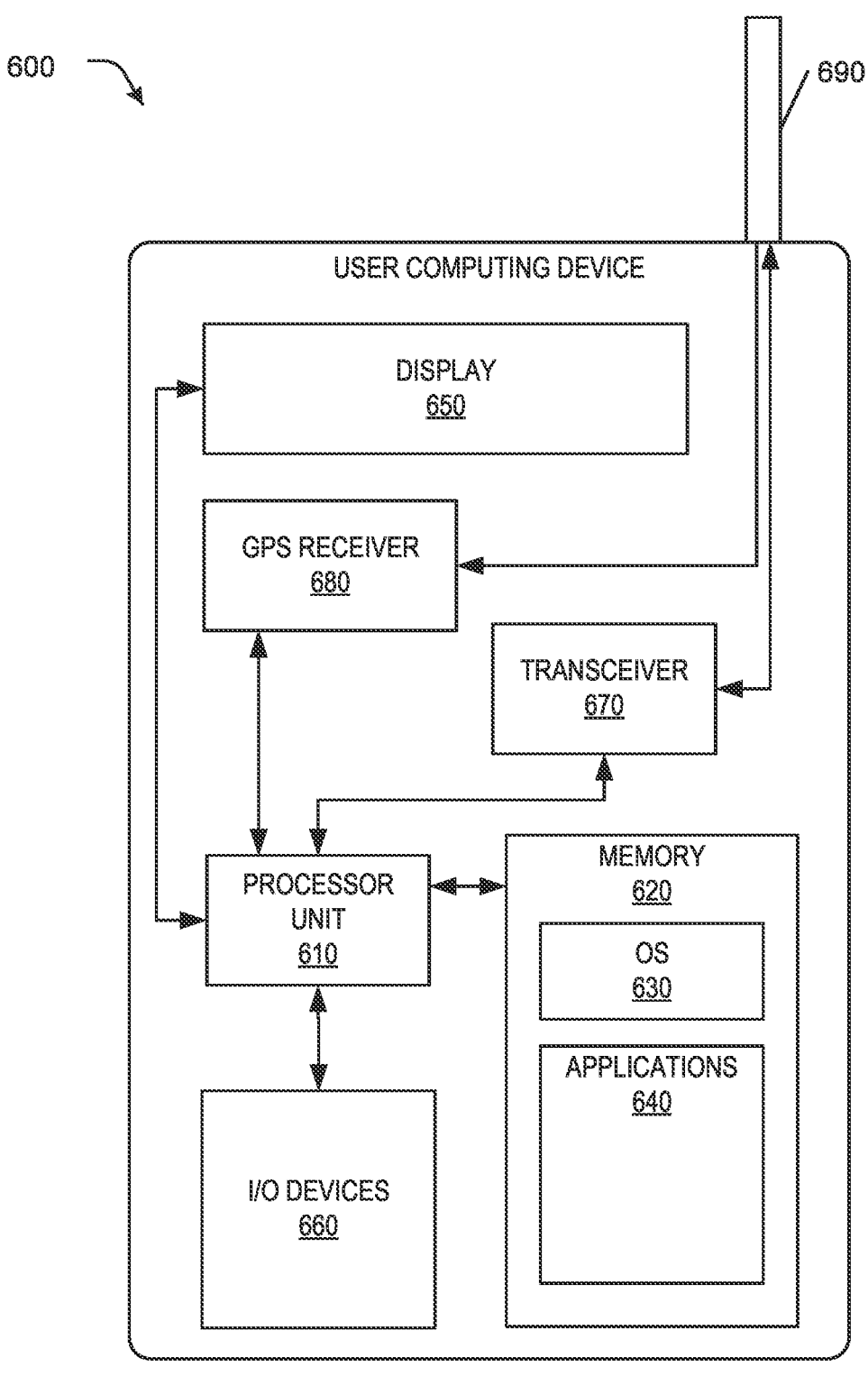
FIG. 6 is a block diagram showing an example architecture of a user computing device.

FIG. 6 is a block diagram showing an example architecture 600 of a computing device. The architecture 600 may, for example, describe any of the computing devices described herein, including, for example, the user computing device 102 and the mobile computing devices 124B, 124C, 124N. The architecture 600 comprises a processor unit 610. The processor unit 610 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 620, such as a Random Access Memory (RAM), a flash memory, or another type of memory or data storage, is typically accessible to the processor. The memory 620 may be adapted to store an operating system (OS) 630, as well as application programs 640. In some examples, the memory 620 may also store data describing voices including, for example, data describing the set of known voices, data describing unknown ambient voices that have been indicated at an audio sensor, etc.

The processor unit 610 may be coupled, either directly or via appropriate intermediary hardware, to a display 650 and to one or more I/O devices 660, such as a keypad, a touch panel sensor, a microphone, and the like. Such I/O devices 660 may include a touch sensor for capturing fingerprint data, a camera for capturing one or more images of the user, a retinal scanner, or any other suitable devices. I/O devices 660 may be used to implement I/O channels, as described herein. In some examples, I/O devices may also include sensors such as, for example, the audio sensor 107 described herein.

Similarly, in some examples, the processor unit 610 may be coupled to a transceiver 670 that interfaces with an antenna 690. The transceiver 670 may be configured to both transmit and receive cellular network signals, wireless data signals, or other types of signals via the antenna 690, depending on the nature of the computing device implemented by the architecture 600. Although one transceiver 670 is shown, in some examples, the architecture 600 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a GPS receiver 680 may also make use of the antenna 690 to receive GPS signals. In addition to or instead of the GPS receiver 680, any suitable location-determining sensor may be included and/or used, including, for example, a Wi-Fi positioning system. In some examples, the architecture 600 (e.g., processor unit 610) may also support a hardware interrupt. In response to a hardware interrupt, the processor unit 610 may pause its processing and execute an interrupt service routine (ISR).

Figure 7:
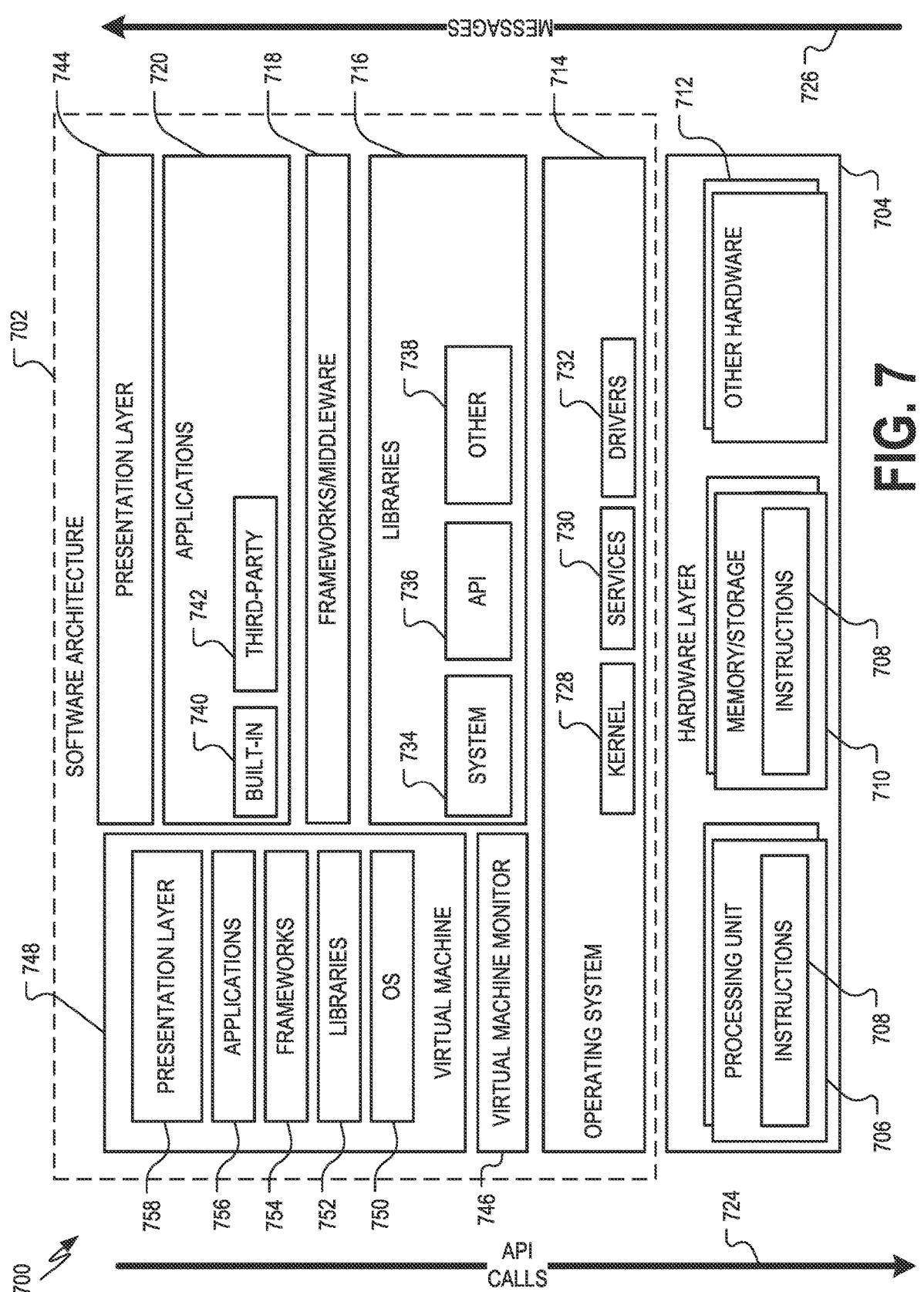
FIG. 7 is a block diagram showing one example of a software architecture for a computing device.

FIG. 7 is a block diagram 700 showing one example of a software architecture 702 for a computing device. The software architecture 702 maybe used in conjunction with various hardware architectures, for example, as described herein. FIG. 7 is merely a non-limiting example of a software architecture 702 and many other architectures may be implemented to facilitate the functionality described herein. A representative hardware layer 704 is illustrated and can represent, for example, any of the above-referenced computing devices. In some examples, the hardware layer 704 may be implemented according to an architecture 800 of FIG. 8 and/or the architecture 600 of FIG. 6.

The representative hardware layer 704 comprises one or more processing units 706 having associated executable instructions 708. The executable instructions 708 represent the executable instructions of the software architecture 702, including implementation of the methods, modules, components, and so forth of FIGS. 1-5. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the architecture 800.

In the example architecture of FIG. 7, the software architecture 702 may be conceptualized as a stack of layers where each layer provides particular functionality. For example, the software architecture 702 may include layers such as an OS 714, libraries 716, frameworks/middleware 718, applications 720, and a presentation layer 744. Operationally, the applications 720 and/or other components within the layers may invoke Application Programming Interface (API) calls 724 through the software stack and receive a response, returned values, and so forth illustrated as messages 726 in response to the API calls 724. The layers illustrated are representative in nature and not all software architectures have all layers. For example, some mobile or special-purpose OSs may not provide a frameworks/middleware 718 layer, while others may provide such a layer. Other software architectures may include additional or different layers.

The OS 714 may manage hardware resources and provide common services. The OS 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers.

In some examples, the services 730 include an interrupt service. The interrupt service may detect the receipt of a hardware or software interrupt and, in response, cause the software architecture 702 to pause its current processing and execute an ISR when an interrupt is received. The ISR may generate an alert.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than by interfacing directly with the underlying OS 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphical user interface (GUI) functions, high-level resource management, high-level location services, and so forth. The frameworks 718 may provide a broad spectrum of other APIs that may be utilized by the applications 720 and/or other software components/modules, some of which may be specific to a particular OS or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile OS such as iOS™, Android™, Windows® Phone, or other computing device OSs. In this example, the third-party application 742 may invoke the API calls 724 provided by the mobile OS such as the OS 714 to facilitate functionality described herein.

The applications 720 may utilize built-in OS functions (e.g., kernel 728, services 730, and/or drivers 732), libraries (e.g., system libraries 734, API libraries 736, and other libraries 738), or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 7, this is illustrated by a virtual machine 748. A virtual machine creates a software environment where applications/modules can execute as if they were executing on a hardware computing device. The virtual machine 748 is hosted by a host OS (e.g., OS 714) and typically, although not always, has a virtual machine monitor 746, which manages the operation of the virtual machine 748 as well as the interface with the host OS (e.g., OS 714). A software architecture executes within the virtual machine 748, such as an OS 750, libraries 752, frameworks/middleware 754, applications 756, and/or a presentation layer 758. These layers of software architecture executing within the virtual machine 748 can be the same as corresponding layers previously described or may be different.

Figure 8:
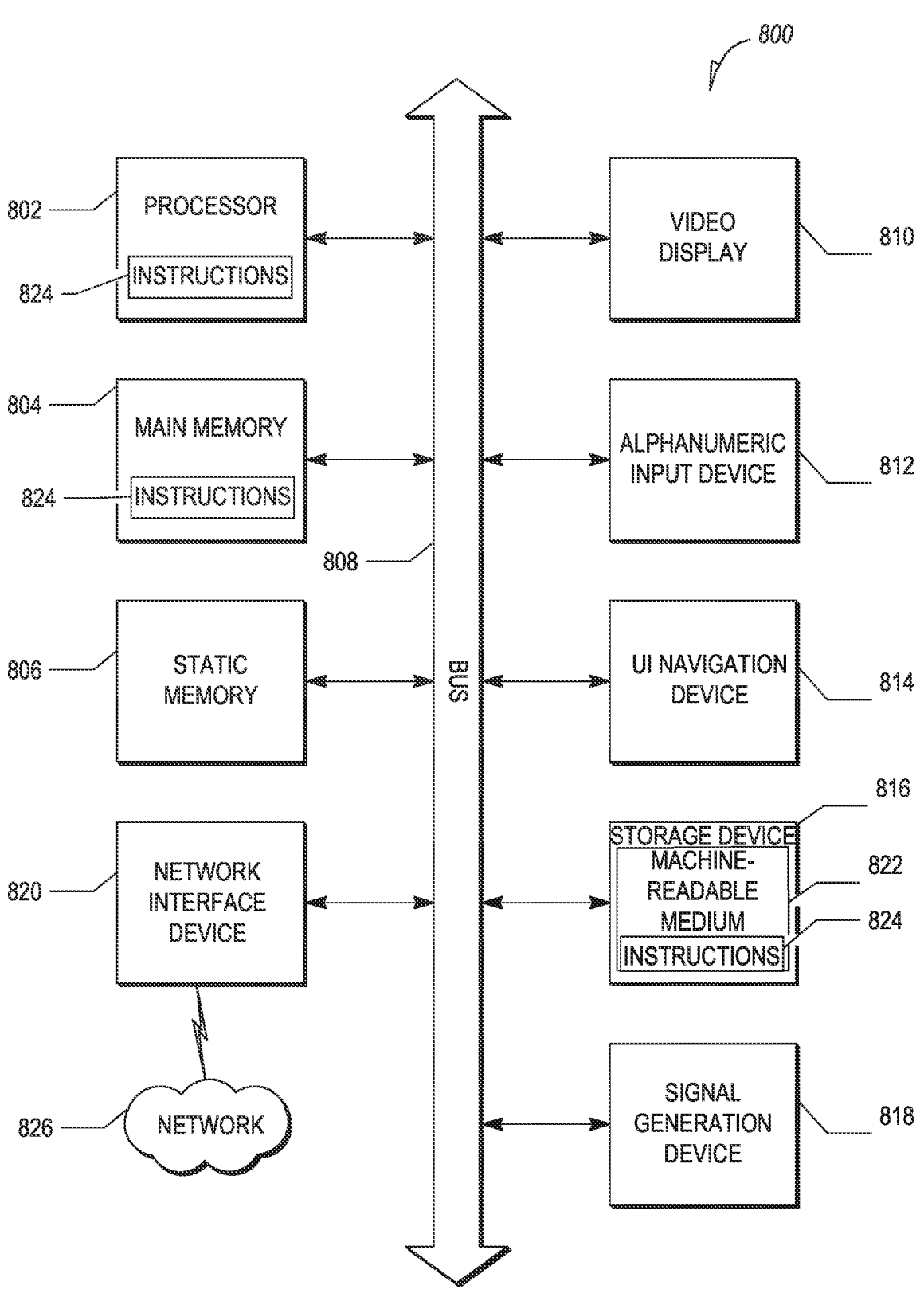
FIG. 8 is a block diagram illustrating a computing device hardware architecture, within which a set or sequence of instructions can be executed to cause a machine to perform examples of any one of the methodologies discussed herein.

FIG. 8 is a block diagram illustrating a computing device hardware architecture 800, within which a set or sequence of instructions can be executed to cause a machine to perform examples of any one of the methodologies discussed herein. The architecture 800 may describe, for example, any of the network-enabled devices herein as well as, for example, the user computing device 102, one or more of the mobile computing devices 124B, 124C, 124N, the provider system 120, etc.

The architecture 800 may execute the software architecture 702 described with respect to FIG. 7. The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 800 includes a processor unit 802 comprising at least one processor (e.g., a central processing unit (CPU), a graphics processing unit (GPU), or both, processor cores, compute nodes, etc.). The architecture 800 may further comprise a main memory 804 and a static memory 806, which communicate with each other via a link 808 (e.g., bus). The architecture 800 can further include a video display unit 810, an alphanumeric input device 812 (e.g., a keyboard), and a UI navigation device 814 (e.g., a mouse). In some examples, the video display unit 810, alphanumeric input device 812, and UI navigation device 814 are incorporated into a touchscreen display. The architecture 800 may additionally include a storage device 816 (e.g., a drive unit), a signal generation device 818 (e.g., a speaker), a network interface device 820, and one or more sensors (not shown), such as a GPS sensor, compass, accelerometer, or other sensor.

In some examples, the processor unit 802 or another suitable hardware component may support a hardware interrupt. In response to a hardware interrupt, the processor unit 802 may pause its processing and execute an ISR, for example, as described herein.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, within the static memory 806, and/or within the processor unit 802 during execution thereof by the architecture 800, with the main memory 804, the static memory 806, and the processor unit 802 also constituting machine-readable media. The instructions 824 stored at the machine-readable medium 822 may include, for example, instructions for implementing the software architecture 702, instructions for executing any of the features described herein, etc.

While the machine-readable medium 822 is illustrated in an example to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A user computing device programmed to interface with a user, the user computing device comprising at least one processor programmed to perform operations comprising:
   determining that an audio sensor in communication with the at least one processor indicates a first human voice, the first human voice being of the user;
   determining that the audio sensor indicates a second human voice, the second human voice being different than the first human voice;
   determining that the second human voice does not match any voice in a set of known human voices;
   determining that the second human voice has been detected more than a threshold number of times;
   responsive to determining that the second human voice has been detected more than the threshold number of times, prompting the user to provide a privacy level for the second human voice;
   determining that the audio sensor indicates a first command in the first human voice and indicates the second human voice, the first command instructing the user computing device to perform a first task; and
   executing the first task at the privacy level for the second human voice.

2. The user computing device of claim 1, the operations further comprising:
   determining that the audio sensor indicates a third human voice different than the first human voice and the second human voice;
   determining that the third human voice does not match any voice in the set of known human voices; and
   incrementing a record indicating a number of times that the third human voice is detected.

3. The user computing device of claim 1, further comprising, adding the second human voice to the set of known human voices.

4. The user computing device of claim 1, the determining that the second human voice has been detected more than the threshold number of times comprising determining that stored data describing ambient human voices that were not matched to one of the set of known human voices describes the second human voice more than the threshold number of times.

5. The user computing device of claim 1, the determining that the second human voice has been detected more than the threshold number of times comprising determining that the second human voice has been detected more than the threshold number of times in a first time period.

6. The user computing device of claim 1, the operations further comprising, before prompting the user to provide the privacy level for the second human voice, causing an audio output device of the user computing device to play a sample of the second human voice to the user.

7. The user computing device of claim 1, the operations further comprising:
   sending an indication of the second human voice to a remote computing system;
   receiving, from the remote computing system, identity data describing the second human voice; and
   before prompting the user to provide the privacy level for the second human voice, providing the identity data describing the second human voice to the user.

8. The user computing device of claim 1, the operations further comprising:
   determining that the audio sensor indicates a third human voice different than the first human voice;
   determining that the audio sensor indicates a second command in the first human voice, wherein the second command instructs the user computing device to perform a second task;
   determining that a second computing device associated with the third human voice is within a threshold distance of the user computing device;
   after determining that the second computing device associated with the third human voice is within the threshold distance of the user computing device, selecting a privacy level for the second task based at least in part on the second human voice; and
   executing the second task at the privacy level for the second task.

9. The user computing device of claim 8, the operations further comprising:
   determining that the audio sensor indicates a third command in the first human voice, wherein the third command instructs the user computing device to perform a third task;
   determining that the audio sensor indicates the third human voice;
   determining that the second computing device is not detected within the threshold distance of the user computing device; and
   after determining that the second computing device is not detected within the threshold distance of the user computing device, executing the third task at a privacy level for the third task that is less private than the privacy level for the second task.

10. The user computing device of claim 1, the operations further comprising:
   determining that a personal audio device is connected to the user computing device; and
   before executing the first task at the privacy level for the second human voice, modifying the privacy level for the second human voice based at least in part on the determining that the personal audio device is connected to the user computing device.

11. A computer-implemented method for interfacing a user computing device with a user, the computer-implemented method comprising:

determining, by the user computing device, that an audio sensor of the user computing device indicates a first human voice, the first human voice being of the user;

determining, by the user computing device, that the audio sensor indicates a second human voice, the second human voice being different than the first human voice;

determining, by the user computing device, that the second human voice does not match any voice in a set of known human voices;

determining, by the user computing device, that the second human voice has been detected more than a threshold number of times;

responsive to determining that the second human voice has been detected more than the threshold number of times, prompting the user, by the user computing device, to provide a privacy level for the second human voice;

determining, by the user computing device, that the audio sensor indicates a first command in the first human voice and indicates the second human voice, the first command instructing the user computing device to perform a first task; and executing, by the user computing device, the first task at the privacy level for the second human voice.

12. The computer-implemented method of claim 11, further comprising:

determining, by the user computing device, that the audio sensor indicates a third human voice different than the first human voice and the second human voice;

determining, by the user computing device, that the third human voice does not match any voice in the set of known human voices; and incrementing, by the user computing device, a record indicating a number of times that the third human voice is detected.

13. The computer-implemented method of claim 11, further comprising, adding, by the user computing device, the second human voice to the set of known human voices.

14. The computer-implemented method of claim 11, the determining that the second human voice has been detected more than the threshold number of times comprising determining that stored data describing ambient human voices that were not matched to one of the set of known human voices describes the second human voice more than the threshold number of times.

15. The computer-implemented method of claim 11, the determining that the second human voice has been detected more than the threshold number of times comprising determining that the second human voice has been detected more than the threshold number of times in a first time period.

16. The computer-implemented method of claim 11, further comprising, before prompting the user to provide the privacy level for the second human voice, causing an audio output device of the user computing device to play a sample of the second human voice to the user.

17. The computer-implemented method of claim 11, further comprising:

sending, by the user computing device, an indication of the second human voice to a remote computing system;

receiving, from the remote computing system, identity data describing the second human voice; and before prompting the user to provide the privacy level for the second human voice, providing the identity data describing the second human voice by the user computing device to the user.

18. The computer-implemented method of claim 11, further comprising:

determining, by the user computing device, that the audio sensor indicates a third human voice different than the first human voice;

determining, by the user computing device, that the audio sensor indicates a second command in the first human voice, wherein the second command instructs the user computing device to perform a second task;

determining, by the user computing device, that a second computing device associated with the third human voice is within a threshold distance of the user computing device;

after determining that the second computing device associated with the third human voice is within the threshold distance of the user computing device, selecting, by the user computing device, a second privacy level for the second task based at least in part on the second human voice; and executing the second task at the second privacy level.

19. The computer-implemented method of claim 18, further comprising:

determining, by the user computing device, that the audio sensor indicates a third command in the first human voice, wherein the third command instructs the user computing device to perform a third task;

determining, by the user computing device, that the audio sensor indicates the third human voice;

determining, by the user computing device, that the second computing device is not detected within the threshold distance of the user computing device; and after determining that the second computing device is not detected within the threshold distance of the user computing device, executing the third task, by the user computing device, at a privacy level for the third task that is less private than the privacy level for the second task.

20. A non-transitory computer-readable medium comprising instructions thereon that, when executed by at least one processor of a user computing device, causes the at least one processor to perform operations comprising:

determining that an audio sensor in communication with the at least one processor indicates a first human voice, the first human voice being of a user associated with the user computing device;

determining that the audio sensor indicates a second human voice, the second human voice being different than the first human voice;

determining that the second human voice does not match any voice in a set of known human voices;

determining that the second human voice has been detected more than a threshold number of times;

responsive to determining that the second human voice has been detected more than the threshold number of times, prompting the user to provide a privacy level for the second human voice;

determining that the audio sensor indicates a first command in the first human voice and indicates the second human voice, the first command instructing the user computing device to perform a first task; and executing the first task at the privacy level for the second human voice.

* * * * *